United States Patent Office 3,216,957
Patented Nov. 9, 1965

3,216,957
ANTISTATIC THERMOPLASTIC VINYL RESIN COMPOSITIONS COMPRISING OXYALKYLATED IMIDAZOLINES
Stephen Krumm, Plainfield, N.J., assignor to Union Carbide Corporation, a corporation of New York
No Drawing. Filed Aug. 14, 1962, Ser. No. 216,734
20 Claims. (Cl. 260—23)

This invention relates to rendering thermoplastic resins, formed from monomers containing the vinyl group, i.e.,

resistant to the accumulation of electrostatic charges. More specifically, this invention relates to vinyl resin compositions which have excellent heat-stability and which have particular utility in the manufacture of sound records characterized by excellent resistivity to the accumulation of electrostatic charges.

Sound records, manufactured from hitherto known vinyl resin compositions, have shown a marked tendency to accumulate substantial electrostatic charges on their surfaces, and as a result, such sound records have been found to have relatively poor audio-properties. Poor audio properties are manifested by gritty background noises, pops, crackles, clicks, swishes and hisses when the record is played. In addition, sound records manufactured from these vinyl resin compositions, because of the accumulation of electrostatic charges, attract and tenaciously hold dust, lint, tobacco ashes, and other fine debris thus detracting from their overall, outward appearance and also degrading their audio properties. Attempts to wipe such unsightly material from the surfaces of the sound records ordinarily results in the generation of greater electrostatic charges and further attraction of fine debris.

In order to either eliminate or to minimize the accumulation of electrostatic charges on the surfaces of sound records manufactured from vinyl resins, many expedients have been suggested. These have ranged from treatment of the records to modification of the resins, from which the sound records are manufactured, by the addition thereto of various modifying materials. For example, it has been proposed to store sound records under controlled temperatures and humidities thereby building up in these records a resistivity to the accumulation of electrostatic charges. The anti-electrostatic properties thus induced in sound records, however, are transitory, lasting for only a short period of time after the sound records are removed from the controlled atmosphere.

Proposals have also been made to coat the surfaces of the sound records with such materials as surfactants in order to prevent the accumulation and/or generation thereon of electrostatic charges. Any improvement in the antielectrostatic properties of the records, thus obtained, is also temporary in nature as the coatings are readily removed through abrading during the normal playing of the sound records.

Modification of vinyl resins by the addition thereto of various modifying materials, although generally superior to the treatment of the sound records because of the degree of permanency of antielectrostatic properties effected, still has serious disadvantages. As an illustration, incorporating conductive carbon black into vinyl resin compositions for the purpose of improving the antielectrostatic properties of the compositions requires that relatively large amounts of such material be used. Such amounts of carbon black so degrade the audio and physical properties of the compositions, that the compositions cannot be used as a material from which stereophonic sound records are manufactured. Utilizing materials such as hydroxy amines, which can be used in small amounts and still serve to render vinyl resin compositions somewhat resistant to the accumulation of electrostatic charges, has also been found deficient since these and other such material exude out of the compositions, appearing as a surface film on the records. Also they degrade the light and heat-stability of the compositions and in some instances corrode the equipment which is used to manufacture the records.

It has now been found, however, that when certain alkylene oxide adducts of 2-alkyl-2-imidazoline or the acid salts thereof are used in combination with specific mixed metal soaps in vinyl resin compositions, a synergistic effect occurs rendering the composition highly resistant to the accumulation and generation of electrostatic charges and highly stable when subjected to heat and light, without rendering the composition corrosive or staining to metal. When these vinyl resin compositions are pressed into sound records, the records produced are characterized by both excellent appearance and excellent audio properties.

The compositions of the present invention comprise a thermoplastic vinyl resin, a mixed metal soaps wherein the metal component is a mixture of barium or calcium with cadmium or zinc, such as the barium-cadmium mixed metal soap, the barium-zinc mixed metal soap, calcium-cadmium mixed metal soap, and calcium-zinc mixed metal soap; and an imidazoline of the formula:

Formula I

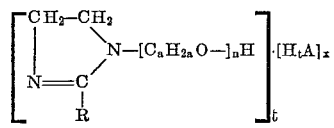

wherein R is a monovalent aliphatic hydrocarbon radical containing from 6 to 18 carbon atoms inclusive, n is an integer having a value of from 1 to 25 inclusive, and preferably from 1 to 5 inclusive, a is an integer having a value of from 2 to 5 inclusive, x is either 0 or 1, such that when x is 0, Formula I represents the 2-imidazoline compounds and when x is 1, Formula I represents the acid salt of the 2-imidazoline compounds, $H_tA$ is an acid capable of forming an acid salt of the imidazoline. In the formula $H_tA$, H represents a hydrogen ion, A represents the anion portion of the acid and t is equal to the valence of A, the anion portion of the acid. For example, if the acid were tribasic such as phosphoric acid ($H_3PO_4$) A would be $PO_4^\equiv$ and t would be 3.

Illustrative of the monovalent aliphatic hydrocarbon radicals represented by R are the alkyl radicals containing from 6 to 18 carbon atoms inclusive, such as hexyl, heptyl, octyl, nonyl, decyl, undecyl, dodecyl, tridecyl, tetradecyl, pentadecyl, hexadecyl, heptadecyl, octadecyl, and the like; and the alkenyl radicals, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, octadecadienyl, octadecartrienyl, and the like.

Illustrative of the acids represented by $H_tA$ are the inorganic acids such as sulfuric, sulfurous, nitric, boric, phosphoric, phosphorous, hydrochloric, hydrobromic, hydroiodic and the like; and the organic acids such as acetic, propionic, butyric, pentanoic, adipic, citric, oxalic, tartaric and the like.

As has been stated above while $n$ can have a value of from one to twenty-five inclusive, it is preferred to use a 2-imidazoline compound wherein $n$ has a value of from 1 to 5 inclusive. The lower values are preferred because such compounds are prepared with greater facility using standard equipment and are therefore generally more readily available.

Of the alkylene oxide adducts, those of ethylene oxide and propylene oxide (i.e. having a value of 2 or 3 respectively), are preferred for the same reasons.

These alkylene oxide adducts of the 2-alkyl-2-imidazolines and the acid salts thereof can be readily prepared by methods known to the art. The 2-alkyl-2-imidazoline is first prepared through the alkylation of 2-imidazoline utilizing the method of Kyrides et al. as described in J. Org. Chem. 12, 557–86 (1947). By this method 2-imidazoline is reacted with an alkyl halide (RX) by heating the reaction mixture to reflux. The 2-alkylated-2-imidazoline prepared has the formula:

Formula II

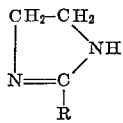

wherein R is as defined above.

The 2-alkyl-2-imidazoline is then reacted with from about one to about 25 moles of alkylene oxide, such as ethylene oxide, propylene oxide and the like, per mole of amine, to produce 2-alkyl-2-imidazolines of the formula:

Formula III

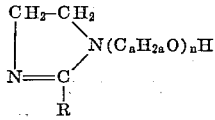

Preparation of the alkylene oxide adducts of 2-alkyl-2-imidazoline can be accomplished by following methods similar to those of Yatsenko et al., reported in Vastnik Moskov. Bosudarst University (1953), No. 6, pp. 129–132.

The acid salts of the alkylene oxide adducts of the 2-alkyl-2-imidazolines can be prepared merely by admixing the desired acid with the alkylene oxide adduct of 2-alkyl-2-imidazoline, preferably in an organic diluent which is a solvent for the imidazoline but not for the acid salt. The acid salt formed precipitates to the bottom of the reaction vessel and can be recovered by filtration.

The mixed metal soaps which are used in the compositions of the present invention are mixtures of metal soaps, i.e. metal salts of fatty acids, as represented by Formulae IV and V below:

Formula IV

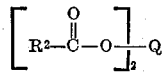

wherein

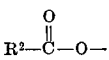

is the anion of a fatty acid containing from 10 to 18 carbon atoms inclusive, or mixtures of said fatty acids, such as capric acid, undecylic acid, lauric acid, tridecanoic acid, myristic acid, pentadecanoic acid, palmitic acid, margaric acid, stearic acid, linoleic acid, linolenic acid and the like; and Q represents either a barium ion or a calcium ion; and Formula V

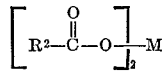

wherein

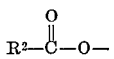

has been previously defined and M is a zinc ion or a cadium ion.

The metal soaps represented above by Formulae IV and V may be soaps of single fatty acids or mixtures of fatty acids. In practice, however, they are generally used as fatty acid mixtures due to the fact that these mixtures are difficult to separate, and are readily available as mixtures.

In the mixed metal soaps used in the present invention cadmium or zinc represented by M, above, must be present in an amount of at least five percent by weight based on the total metals content of the soaps. It has been found preferable, however, to use mixed metal soaps which have a cadmium or zinc content of from ten to twenty-five percent by weight based on the total metals content of the soap, when the resin composition of the present invention is to be used for the manufacture of sound records. Such sound records have better appearance and enhanced anti-static properties.

The mixed metal soaps as used in the present invention can be prepared by forming an aqueous solution of the alkali salts of the fatty acids desired and introducing to this solution an aqueous solution of the nitrates barium or calcium and zinc or cadmium in the proper proportion based on the metal content of the nitrates. The barium or calcium and zinc or cadmium salts of the fatty acids form and precipitate from the aqueous solution as insoluble metal salts or soaps mixed in the same proportion as the nitrates added. The mixed metal soaps are recovered by filtration and washed with water.

The 2-imidazoline compounds as represented by Formula I above are used in the compositions of the present invention in an amount sufficient to render the compositions resistant to the accumulation of electrostatic charges. This amount must be at least about 0.25 percent by weight based upon the total weight of the active ingredients of the resin composition. The term "active ingredients," as herein used, refers to the resin, the mixed metal soaps and the 2-imidazoline compound as distinguished from other additives which can also be present such as fillers, pigments, dyes and the like. Generally the 2-imidazoline compounds are used in an amount of from about 0.50 to about 2.00 percent by weight based upon the total weight of the active ingredients. When the resin compositions are to be used for the manufacture of sound records, it has been found desirable to use from about 0.75 to about 1.50 percent by weight of the 2-imidazoline compound based on the total weight of the active ingredients as such compositions have greater resistivity to electrical charge accumulation combined with better appearance.

The mixed metal soaps, as represented by Formulae IV and V above, are used in the compositions of the present invention in an amount sufficient to render the composition stable to heat and light. Such an amount is sufficient to produce a synergistic effect with the 2-imidazoline compunds of Formula I above. This amount must be at least about 0.50 percent. Generally the mixed metal soap is used in an amount of from 1.0 to about 5.0 percent by weight based upon the total active ingredients of the resin composition. However, when the resin compositions of the present invention are to be used for the manufacture of sound records, it is preferred to use from about 1.0 to about 2.0 percent by weight of the mixed metal soaps based upon the total weight of the active ingredients, as lesser amounts cause the appearance of the records to be unsatisfactory and greater amounts tend to adversely affect audio characteristics.

The 2-amidazoline compounds, the mixed metal soaps and the thermoplastic vinyl resins are admixed in any suitable apparatus, as for example an Banbury, a ribbon blender, a Hobart mixer, a paddle blender, an extruder and a Henschel mill. The materials can be admixed as solids or if desired, the 2-imidazoline compounds can be first dissolved in a suitable alcohol such as isopropanol and the alcoholic solutions thus formed, admixed with the desired vinyl resin. In those instances wherein an alcoholic solution of a 2-imidazoline compound is used, the alcohol is driven off during the blending operation.

The manufacture of sound records from compositions of this invention is described in the examples of this application.

Illustrative of vinyl monomers containing the

group, and mixtures thereof which can be homopolymerized or copolymerized to form thermoplastic polymers which can be utilized in accordance with the present invent are the following: vinyl aryls such as styrene, o-methoxystyrene, p-methoxystyrene, m-methoxystyrene, o-nitrostyrene, m-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides such as vinyl chloride, vinylidene chloride, vinylidene bromide and the like; vinyl esters such as vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide, N,N-dimethyl methacrylamide, acrylonitrile, chloroacrylonitrile, methacrylonitrile, ethacrylonitrile, and the like; alkayl esters of maleic and fumaric acid such as dimethyl maleate, diethyl maleate and the like; vinyl alkyl esters and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidine, ethyl methylene malonate and the like, and modified vinyl polymers such as polystyrene modified with rubber, polystyrene modified with hydrocarbon wax and the like.

Particularly effective results are achieved by adding the 2-imidazoline compounds and the mixed metal soaps to vinyl chloride homopolymers and polymers of vinyl chloride and at least one other monoethylenically unsaturated monomer, as for example described above.

The compositions of this invention can also contain various other materials such as dyes, pigments, stabilizers, fillers, plasticizers, lubricants, surface-active agents and the like, which are well known to the art.

In the following examples, which illustrate the present invention without limiting the scope thereof in any manner, tests noted therein were carried out as follows:

AUDIO TEST

High fidelity reproduction equipment of "professional quality" was used to listen to unplayed and wear-tested records. Amplifier settings were as follows: no bass, full treble, high volume, flat-unfiltered response. An experienced panel of four people listened to the unmodified and anti-static modified records and rated them qualitatively based on freedom from the previously mentioned audio defects. Records were rated on the basis of audio reproduction generally and specifically in the following respects:

(a) Silent lead-in grooves
(b) Silent cross-over grooves
(c) Silent lead-out grooves
(d) Silent lead-out spiral
(e) Modulated areas near outside, center and inside

CIGARETTE ASH PICK-UP TEST

The surface of each record was rubbed vigorously in a circular manner for 10 seconds with a woolen cloth. Each record was held one inch above cigarette ashes. The amount of ash picked up on the surface of each record was quantitatively estimated as heavy, medium, slight or none.

ELECTROSTATIC TEST

Each record was given a positive 8 kv. corona charge after which each record was rotated approximately one inch above a detector and the maximum positive and negative voltage accumulations thereon noted. The detector used was a vacuum tube electrometer which was fitted with a static detector probe. The electrometer reading taken 60 seconds after charge application, using a detector described, was then noted. Records having good antielectrostatic properties bled off the charge very quickly, and as a result gave readings of $+3$ or $-3$ to values approaching 0.

Readings of from $+3$ to $-3$ to values approaching 0 are considered to be indicative of excellent anti-static properties. In the examples that follow the data from the Electrostatic Test are listed as maximum and minimum values which are maximum and minimum deflections of the galvanometer needle in the electrometer as the probe passed over the record surface. Readings of $+11$ and $-11$ were the highest and lowest values obtainable from the electrometer used.

Results reported in the examples with respect to the Audio Test, the Cigarette Ash Pick-Up Test and the Electrostatic Test are average values obtained on testing 10 records manufactured from each composition noted.

Amounts noted in the examples are in parts by weight unless otherwise noted.

Example 1

Compositions whose formulations are noted below were compounded in a Banbury mixer at a temperature of 150° C. for a period of from about 2½ to 3 minutes, given eight to ten end-passes on a two roll mill at a temperature of 130° C., sheeted off, cut into the shape of biscuits, and compression molded into 12-inch diameter stereophonic sound records under a pressure of 1750 pounds per square inch gauge and a peak temperature of 150° C.

The compositions below were prepared for one control composition and eight test or experimental compositions. The test compositions were identical for all ingredients except for the 2-imidazoline compound which was varied in each test composition. The control composition was identical with the test compositions except that the 2-imidazoline compound was deleted entirely.

| Ingredients | Amounts | |
|---|---|---|
| | Control | Test |
| Copolymer of vinyl chloride and vinyl acetate containing from about 85 to about 87 percent by weight combined vinyl chloride and from about 13 to about 15 percent by weight combined vinyl acetate | 97.5 | 96.0 |
| Carbon black | 1.0 | 1.0 |
| Mixed metal soaps (defined below) | 1.5 | 1.5 |
| 2-imidazoline compound (defined below) | 0.0 | 1.5 |

The mixed metal soap stabilizer used in the control and test compositions A through H was a mixture of about 55 percent barium-cadmium palmitate and about 45 percent barium-cadmium stearate in which the cadmium was present in an amount of about 20 percent by weight based upon the total metals content of the soap and the barium was present in an amount of about 80 percent by weight based upon the total metals content.

The 2-imidazoline compounds used in each formulation had the following formula:

$$\left[ \begin{array}{c} CH_2-CH_2 \\ | \quad\quad\quad N-[C_aH_{2a}-O]_nH \\ N=C \\ | \\ R \end{array} \right]_t \cdot [H_tA]_x$$

wherein:

| Test Composition | 2-Imidazoline |
|---|---|
| 1-A | R is a decyl radical, $a=2$, $n=1$, $x=0$. |
| 1-B | A mixture of 2-imidazoline containing about 60% of the 2-imidazoline compound of Test Composition 1, above and 40% of a 2-imidazoline wherein: R is a dodecyl radical, $a=2$, $n=1$, $x=0$. |
| 1-C | A mixture of 2-imidazoline compounds comprising about 60% of a 2-imidazoline compound wherein R is a decyl radical and about 40% of a 2-imidazoline compound wherein R is a dodecyl radical and $a=2$, $n=1$, $x=1$, $t=1$, and $H_tA$ is nitric acid. |
| 1-D | The 2-imidazoline compound of a Test Composition 3, above, except wherein $H_tA$ is sulfuric acid. |
| 1-E | The 2-imidazoline compound of Test Composition 3 above, except wherein $H_tA$ is acetic acid, $x=1$, $t=1$. |
| 1-F | The 2-imidazoline compound of Test Composition 3 above, except wherein $H_tA$ is phosphoric acid, $x=1$, $t=3$. |
| 1-G | The 2-imidazoline compound of Test Composition 3 above, except wherein $H_tA$ is adipic acid, $x=1$, $t=2$. |
| 1-H | The 2-imidazoline compound of Test Composition 3 above, except that $H_tA$ is citric acid, $x=1$, $t=3$. |

Sound records, formed from each composition were placed in a box wherein the relative humidity was ten percent and the temperature was 23° C. and allowed to remain enclosed therein for a period of 24 hours. These records were then subjected to the "Electrostatic Test."

In addition, other sound records formed from these compositions, were placed in a box, wherein the relative humidity was thirty-five percent, and the temperature was 23° C. and allowed to remain there for a period of 24 hours. These records were then subjected to the "Cigarette Ash Pick-Up Test."

Each test and the results thereof are noted in the table below:

ELECTROSTATIC TEST 8 KV.-ELECTROMETER READING AFTER 60 SECONDS

| | Maximum | Minimum | Cigarette Ash Pick-test |
|---|---|---|---|
| Sound Records Made from Control 1 | −11 | −5 | Heavy. |
| Sound Records Made from Test Composition A | −2 | +2 | None. |
| Sound Records Made from Test Composition B | −3 | 0 | Do. |
| Sound Records Made from Test Composition C | −1 | 0 | Do. |
| Sound Records Made from Test Composition D | −2 | +1 | Do. |
| Sound Records Made from Test Composition E | −2 | 0 | Do. |
| Sound Records Made from Test Composition F | −1 | +1 | Do. |
| Sound Records Made from Test Composition G | −3 | +2 | Do. |
| Sound Records Made from Test Composition H | −1 | +2 | Do. |

Audio properties and surface appearance of all above records were judged satisfactory.

*Example 2*

In a manner similar to that described in Example 1, compositions whose formulations are noted below, were compounded, cut into biscuits and compression molded into 12-inch diameter stereophonic sound records.

The compositions below were prepared for one control composition and 12 test compositions. The test compositions were identical for all ingredients except for the mixed metal soap stabilizer which was varied in each test composition. The control composition contained no imidazoline compound but did contain a mixed metal stabilizer which was necessary in order to compound the composition.

| Ingredients | Amounts | |
|---|---|---|
| | Control | Test |
| Copolymer of vinylchloride and vinyl acetate containing from about 85 to about 87 percent by weight combined vinylchloride and from about 13 to about 15 percent by weight combined vinyl acetate | 97.5 | 96.5 |
| Carbon black | 1.0 | 1.0 |
| 2-imidazoline compound | 0 | 1.0 |
| Mixed metal soap | 1.5 | 1.5 |

The 2-imidazoline compound used in the above compositions has the following formula:

$$\begin{array}{c} CH_2-CH_2 \\ | \quad\quad\quad N-CH_2-CH_2-OH \\ N=C \\ | \\ (CH_2)_9-CH_3 \end{array}$$

The mixed metal soap used in the above compositions are as indicated below.

Control: Barium/stearate-cadium stearate wherein the cadmium represents about 15 percent of the total metals content.

Test Composition 2-A: Same mixed metal soap stabilizer as used in the control composition above.

Test Composition 2-B: Barium stearate-barium palmitate/cadmium stearate-cadmium palmitate wherein the cadmium represents about 15 percent of the total metals content and wherein stearate comprises about 44 percent of the total fatty acid content.

Test Composition 2–C: Barium stearate-barium palmitate/cadmium stearate-cadmium palmitate wherein the cadmium represents about 20 percent of the total metals content and wherein stearates comprise about 44 percent and palmitates about 54 percent of the total fatty acid content.

Test Composition 2–D: Barium stearate-barium palmitate/cadmium stearate-cadmium palmitate wherein the cadmium represents about 10 percent of the total metals content and wherein stearates comprise about 44 percent and palmitates about 53 percent of the total fatty acid content.

Test Composition 2–E: Barium stearate-barium palmitate/cadmium stearate-cadmium palmitate wherein the cadmium represents about 12 percent of the total metals content and wherein the stearates comprise about 44 percent and palmitates about 53 percent of the total fatty acid content.

Test Composition 2–F: Barium stearate-barium palmitate/cadmium stearate-cadmium palmitate wherein the cadmium represents about 16 percent of the total metals content and wherein stearates comprise about 44 percent and palmitates about 54 percent of the total fatty acid content.

Test Composition 2–G: Barium stearate-barium palmitate/zinc stearate-zinc palmitate wherein the zinc represents about 20 percent of the total metals content and wherein the stearate comprises about 44 percent and the palmitate about 54 percent of the total fatty acids content.

Test Composition 2–H: Barium stearate-barium palmitate/cadmium stearate-cadmium palmitate wherein cadmium represents about 18 percent of the total metals and wherein stearate comprises about 44 percent and palmitates about 54 percent of the total fatty acids content.

Test Composition 2–I: Barium stearate-barium palmitate/zinc stearate-zinc palmitate wherein the zinc represents about 25 percent of the total metals content and wherein stearates comprise about 44 percent and palmitates about 53 percent of the total fatty acid content.

Test Composition 2–J: Calcium stearate-calcium palmitate/zinc stearate-zinc palmitate wherein the zinc represents about 20 percent of the total metals content and wherein stearates comprise about 44 percent and palmitates about 54 percent of the total fatty acids content.

Test Composition 2–K: Barium stearate-barium palmitate/cadmium stearate-cadmium palmitate wherein the cadmium represents about 22 percent of the total metals content and wherein stearates comprise about 43 percent and palmitates about 55 percent of the total fatty acids content.

Test Composition 2–L: Barium laurate/cadmium laurate wherein the cadmium represents about 20 percent of the total metals content.

Test Composition 2–M: Barium stearate-barium palmitate/cadmium stearate-cadmium palmitate wherein the cadmium represents about 17 percent of the total metals content and wherein stearates comprise about 44 percent and palmitates about 54 percent of the total fatty acids content.

Sound records, formed from each composition were placed in a box, wherein the relative humidity was ten percent and the temperature was about 23° C. and allowed to remain enclosed therein for a period of about 24 hours. These records were then subjected to the "Electrostatic Test."

In addition, other sound records formed from these compositions, were placed in a box wherein the relative humidity was thirty-five percent, and the temperature was about 23° C. and allowed to remain there for about 24 hours. These records were then subjected to the "Cigarette Ash Pick-Up Test."

Each test and the results thereof are noted in the table below:

ELECTROSTATIC TEST 8 KV.—ELECTROMETER READING READING AFTER 60 SECONDS

| Composition | Maximum | Minimum | Cigarette Ash Pick-Up Test |
|---|---|---|---|
| Control | −11 | −7 | Heavy. |
| 2–A | −2 | 0 | None. |
| 2–B | −2 | +2 | Do. |
| 2–C | −2 | 0 | Do. |
| 2–D | −2 | 0 | Do. |
| 2–E | −2 | 0 | Do. |
| 2–F | −2 | +1 | Do. |
| 2–G | −2 | 0 | Do. |
| 2–H | −2 | 0 | Do. |
| 2–I | −1 | 0 | Do. |
| 2–J | −1 | +1 | Do. |
| 2–K | −2 | 0 | Do. |
| 2–L | −2 | +2 | Do. |
| 2–M | −1 | 0 | Do. |

Audio properties and surface appearance of the records were judged satisfactory.

*Example 3*

In a manner similar to that defined in Example 1 compositions were prepared in which the soap utilized was not a mixed metal soap stabilizer. The formulation of these compositions was identical except for the soap used, as appears below:

| Ingredients | Amounts | |
|---|---|---|
| | Control | Test Composition |
| Copolymer of vinyl chloride and vinyl acetate containing from about 85 to about 87 percent by weight combined vinyl chloride and from about 13 to about 15 percent by weight combined vinyl acetate | 97.5 | 96.5 |
| Carbon black | 1.0 | 1.0 |
| 2-imidazoline compound | 0 | 1.0 |
| Non-mixed metal soap | 1.5 | 1.5 |

The 2-imidazoline compound used was the same as used in Example 2.

The metal soaps used in each composition were as follows.

Composition: Stabilizer
Control — Dibasic lead stearate.
3–A — Dibasic lead stearate.
3–B — Tetrabasic lead fumarate.
3–C — Tribasic lead sulfate.
3–D — Calcium stearate.
3–E — Barium stearate/lead stearate wherein the lead represents about 15 percent of the total metals content.
3–F — Barium stearate/lead stearate in which the lead represents about 20 percent of the total metals content.

Sound records, formed from each composition were placed in a box, wherein the relative humidity was ten percent and the temperature was about 23° C., and allowed to remain there for a period of about 24 hours. The records were then subjected to the "Electrostatic Test."

In addition, other sound records were placed in a box wherein the relative humidity was thirty-five percent and the temperature was about 23° C., and allowed to remain there for a period of about 24 hours. These records were then subjected to the "Cigarette Ash Pick-Up Test."

Each test and the results thereof are noted in the table below:

ELECTROSTATIC TEST 8 KV.-ELECTROMETER READING AFTER 60 SECONDS

| Composition | Maximum | Minimum | Cigarette Ash Pick-Up Test |
|---|---|---|---|
| Control | −11 | +1 | Heavy. |
| 3-A | −11 | +1 | Do. |
| 3-B | −11 | +2 | Do. |
| 3-C | −11 | +2 | Do. |
| 3-D | −11 | +2 | Do. |
| 3-E | −11 | 0 | Do. |
| 3-F | −11 | +2 | Do. |

Audio properties and surface appearance of the records were judged satisfactory.

What is claimed is:

1. A composition comprising a thermoplastic vinyl resin, a 2-imidazoline compound having the formula:

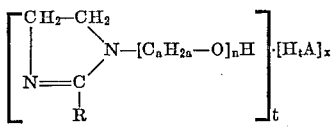

wherein R is a monovalent aliphatic hydrocarbon radical containing from 6 to 18 carbon atoms inclusive, $a$ is an integer having a value of from 2 to 5 inclusive, $n$ is an integer having a value of from 1 to 25 inclusive, $H_tA$ is an acid, $t$ is an integer equal in value to the valence of A of the acid $H_tA$ and $x$ is a digit having a value of from 0 to 1 inclusive; and mixed metal soaps comprising essentially a mixture of (a) fatty acid metal salts having the formula:

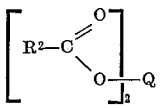

wherein

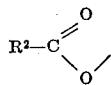

is the anion of a fatty acid containing from 10 to 18 carbon atoms inclusive and Q is a metal cation selected from the group consisting of calcium and barium; and (b) fatty acid metal salts having the formula:

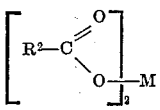

wherein

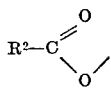

has been previously defined and M is a metal cation selected from the group consisting of cadmium and zinc and wherein M is present in an amount of at least 5 percent by weight based on the total metals content of the fatty acid salts; said 2-imidazoline compound being present in an amount sufficient to render the composition resistant to the accumulation of electrostatic charges and said mixed metal soaps being present in an amount sufficient to render the composition stable to heat and light.

2. A composition comprising a thermoplastic vinyl resin, a 2-imidazoline compound having the formula:

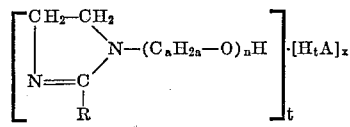

wherein R is a monovalent aliphatic hydrocarbon radical containing from 6 to 18 carbon atoms inclusive, $a$ is an integer having a value of from 2 to 5 inclusive, $n$ is an integer having a value from 1 to 25 inclusive, $H_tA$ is an acid, $t$ is an integer equal to the valence of the anion A of the acid $H_tA$ and $x$ is a digit having a value of from 0 to 1 inclusive; and mixed metal soaps comprising essentially a mixture of (a) fatty acid metal salts having the formula:

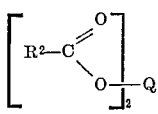

wherein

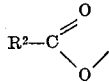

is the anion of a fatty acid containing from 10 to 18 carbon atoms inclusive and Q is a metal cation selected from the group consisting of calcium and barium, and (b) fatty acid metal salts having the formula:

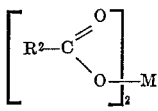

wherein

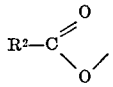

has been previously defined and M is a metal cation selected from the group consisting of cadmium and zinc and wherein M is present in an amount of at least 5 percent by weight based on the total metals content; said 2-imidazoline compound being present in an amount of at least 0.25 percent by weight based upon the total weight of the active ingredients, and said mixed metal soaps being present in an amount of at least about 0.50 percent by weight based upon the total weight of the active ingredients.

3. The composition of claim 2 wherein the 2-imidazoline compound is present in an amount of from about 0.50 to about 2.00 percent by weight based upon the total weight of the active ingredients.

4. The composition of claim 2 wherein the mixed metal soap stabilizer is present in an amount of from about 1.00 to about 5.00 percent by weight based upon the total weight of the active ingredients.

5. The composition of claim 2 wherein the thermoplastic vinyl resin is polyvinyl chloride.

6. The composition of claim 2 wherein the thermoplastic vinyl resin is a copolymer of vinyl chloride and vinyl acetate.

7. The composition of claim 2 wherein Q is barium.

8. The composition of claim 2 wherein Q is calcium.

9. The composition of claim 2 wherein M is cadmium.

10. The composition of claim 2 wherein M is zinc.

11. A composition as defined in claim 2 wherein $n$ is an integer having a value of from 1 to 5 inclusive.

12. A composition as defined in claim 2 wherein the value of $n$ is 1.

13. A composition as defined in claim 2 wherein the value of $a$ is 2.

14. A sound reproducing article made from the composition of claim 2.

15. A composition comprising a thermoplastic vinyl resin, a 2-imidazoline compound having the formula:

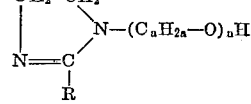

wherein R is a monovalent aliphatic hydrocarbon radical containing from 6 to 18 carbon atoms inclusive, *a* is an integer having a value of from 2 to 5 inclusive, *n* is an integer having a value of from 1 to 25 inclusive; and mixed metal soaps comprising essentially a mixture of (a) fatty acid metal salts having the formula:

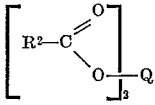

wherein

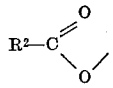

is the anion of a fatty acid containing from 10 to 18 carbon atoms inclusive and Q is a metal cation selected from the group consisting of calcium and barium; and (b) fatty acid metal salts having the formula:

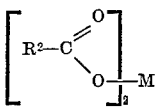

wherein

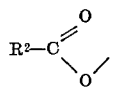

has been previously defined and M is a metal cation selected from the group consisting of cadmium and zinc and wherein M is present in an amount of at least 5 percent by weight based upon the total metals content; said 2-imidazoline compound being present in an amount of at least 0.25 percent by weight based upon the total weight of the active ingredients, and said mixed metal soap stabilizer being present in an amount of at least about 0.50 percent by weight based on the total weight of the active ingredients.
based on the total weight of the active ingredients.

16. A composition as defined in claim 15 wherein Q is barium.

17. A composition as defined in claim 16 wherein M is cadmium.

18. A composition comprising a thermoplastic vinyl resin, a 2-imidazoline compound having the formula:

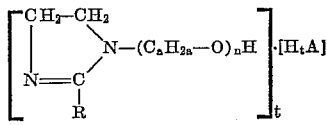

wherein R is a monovalent aliphatic hydrocarbon radical containing from 6 to 18 carbon atoms inclusive, *a* is an integer having a value of from 2 to 5 inclusive, *n* is an integer having a value of from 1 to 25 inclusive, $H_tA$ is an acid and *t* is an integer having a value equal to the valence of the anion A of the acid $H_tA$; and mixed metal soaps consisting essentially of a mixture of (a) fatty acid metal salts having the formula:

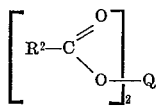

wherein

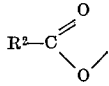

is the anion of a fatty acid, containing from 10 to 18 carbon atoms inclusive and Q is a metal cation selected from the group consisting of calcium and barium; and (b) fatty acid metal salts having the formula:

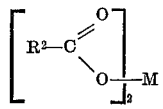

wherein

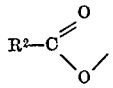

has been previously defined and M is a metal cation selected from the group consisting of cadmium and zinc and wherein M is present in an amount of at least 5 percent by weight based on the total metals content; said 2-imidazoline compound being present in an amount of at least 0.25 percent by weight based upon the total weight of the active ingredients, and said mixed metal soap stabilizer being present in an amount of at least about 0.50 percent by weight based upon the total weight of the active ingredients.

19. A composition as defined in claim 18 wherein Q is barium.

20. A composition as defined in claim 19 wherein M is cadmium.

References Cited by the Examiner

UNITED STATES PATENTS

| | | | |
|---|---|---|---|
| 2,211,001 | 8/40 | Chwala | 260—309.6 |
| 2,267,965 | 12/41 | Wilson | 260—309.6 |
| 2,564,646 | 8/51 | Leistner et al. | 260—45.75 |
| 2,624,725 | 1/53 | Bjorksten et al. | 260—92.8 |
| 2,787,602 | 4/57 | Groves | 260—17.4 |
| 2,868,745 | 1/59 | Canarios | 260—23 |
| 2,987,514 | 6/61 | Hughes et al. | 260—309.6 |
| 3,117,113 | 1/64 | Tudor | 260—92.8 |

FOREIGN PATENTS 820,541  9/59  Great Britain.

LEON J. BERCOVITZ, *Primary Examiner.*

DONALD E. CZAJA, *Examiner.*